United States Patent [19]

Johansson

[11] Patent Number: 5,087,228
[45] Date of Patent: Feb. 11, 1992

[54] DEVICE TO OPPOSE RELATIVE ROTATIONAL MOVEMENT BETWEEN TWO ROTATABLE SHAFTS

[76] Inventor: Sigvard Johansson, Solhult 5380 Grunnebo, Vänersborg, Sweden, S-462 93

[21] Appl. No.: 438,431

[22] PCT Filed: Jun. 27, 1988

[86] PCT No.: PCT/SE88/00355
§ 371 Date: Dec. 6, 1989
§ 102(e) Date: Dec. 6, 1989

[87] PCT Pub. No.: WO88/10378
PCT Pub. Date: Dec. 29, 1988

[30] Foreign Application Priority Data

Jun. 24, 1987 [SE] Sweden ................ 8702625

[51] Int. Cl.$^5$ ................ F16H 1/44
[52] U.S. Cl. ................ 475/88; 475/234; 475/241; 192/59
[58] Field of Search ............ 475/86, 88, 231, 232, 475/234, 240, 241, 245, 249; 192/59, 85 AA, 103 F

[56] References Cited

U.S. PATENT DOCUMENTS

| | | | |
|---|---|---|---|
| 2,025,472 | 12/1935 | Perry, Jr. | 192/59 |
| 3,488,980 | 1/1970 | Burrough | 192/59 |
| 3,987,689 | 10/1976 | Engle | 475/88 |
| 4,041,804 | 8/1977 | Clark | 475/88 |
| 4,445,400 | 5/1984 | Sullivan et al. | 475/88 |
| 4,456,110 | 6/1984 | Hanks et al. | 192/59 X |
| 4,535,651 | 8/1985 | Chambers | 475/234 |
| 4,732,052 | 3/1988 | Dewald | 475/86 |
| 4,811,628 | 3/1989 | Winkem et al. | 475/86 |

FOREIGN PATENT DOCUMENTS 405429 2/1934 United Kingdom ............ 192/59

Primary Examiner—Leslie A. Braun
Assistant Examiner—Benjamin Levi
Attorney, Agent, or Firm—Lerner, David, Littenberg, Krumholz & Mentlik

[57] ABSTRACT

A device to oppose a difference in relative rotational velocity between two rotatable shafts includes a set of primary braking elements arranged to rotate with one of the shafts and a set of secondary braking elements arranged to rotate with the other shaft, whereby both sets of braking elements are moved into engagement with one another from a free running position in order to oppose the difference in rotational velocity between the two shafts. One of the shafts carries a rotatable unit having a circular surface which is slightly displaced from a 90 degree angle from the drive shafts. This unit is connected for rotation with one set of the braking elements and is movable sideways relative to the other set of braking elements connected to the other shaft. The rotatable unit contains a set of movable pistons which engage the angled surface in such a way that when an angular displacement takes place between the pistons and the angled surface, at least one of the pistons is pushed inwardly against the pressure in the fluid system.

11 Claims, 4 Drawing Sheets

DEVICE TO OPPOSE RELATIVE ROTATIONAL MOVEMENT BETWEEN TWO ROTATABLE SHAFTS

FIELD OF THE INVENTION

The present invention relates to a device to oppose relative rotational movement between two rotatable shafts, comprising at least one first braking means rotating together with one of the mentioned shafts, and at least one second braking means rotating together with a rotatable housing designed to cooperate so as to bring along the other of the shafts, the two braking means being designed to be adjusted between a releasing position and a contact position so that upon relative rotational movement between the two shafts the two braking means can be brought into braking contact with one another in order to oppose said relative rotational movement.

BACKGROUND OF THE INVENTION

It is well known to use limited slip differentials to detect differences in rotational speed between two shafts containing braking discs arranged to rotate with each of the two shafts, and to be engaged when a certain difference in rotational speed is reached. In order to activate the engagement of the braking discs, a detection device is required to detect the difference in rotational speed, and to mechanically engage the braking discs. In previous arrangements, the detection device has been complicated and has exhibited functional problems.

SUMMARY OF THE INVENTION

An object of the present invention is to present a simple, but at the same time effective arrangement to oppose differences in speed between two rotating shafts and thereby offer a solution to the driving and traction problems experienced in modern vehicles.

In accordance with the present invention, this objective has been reached by means of a device which is characterized in that one of the shafts has an element which is rotatable together with the shaft and which contains an inclined surface slightly deviating from a perpendicular position relative to the longitudinal axis of the shaft, the element being connected with a braking means associated with the mentioned shaft, which braking means follows the motions of the rotating element, the element being slightly moveable in an axial direction relative to a braking means associated with the other shaft, that connected to and rotating with at least one of the shafts there is a device comprising pistons which may be displaced relative to the aforementioned inclined surface, each piston being situated in a chamber with pressure fluid, and that the pistons are able to cooperate with the inclined surface in such a way that, upon a torsional movement of the inclined surface relative to the pistons, the inclined surface forces at least one of the pistons into its pressure chamber against the resistance of the pressurized fluid. Thus, the slightest difference in relative rotational speed between the two shafts will cause an axial movement of the rotatable element and thereby a braking engagement between the braking means.

BRIEF DESCRIPTION OF THE DRAWINGS

The embodiments of the present invention will now be described by way of example and with reference to the accompanying drawings, in which.

DETAILED DESCRIPTION OF THE PREFERRED EMBODIMENTS

Figure 1:
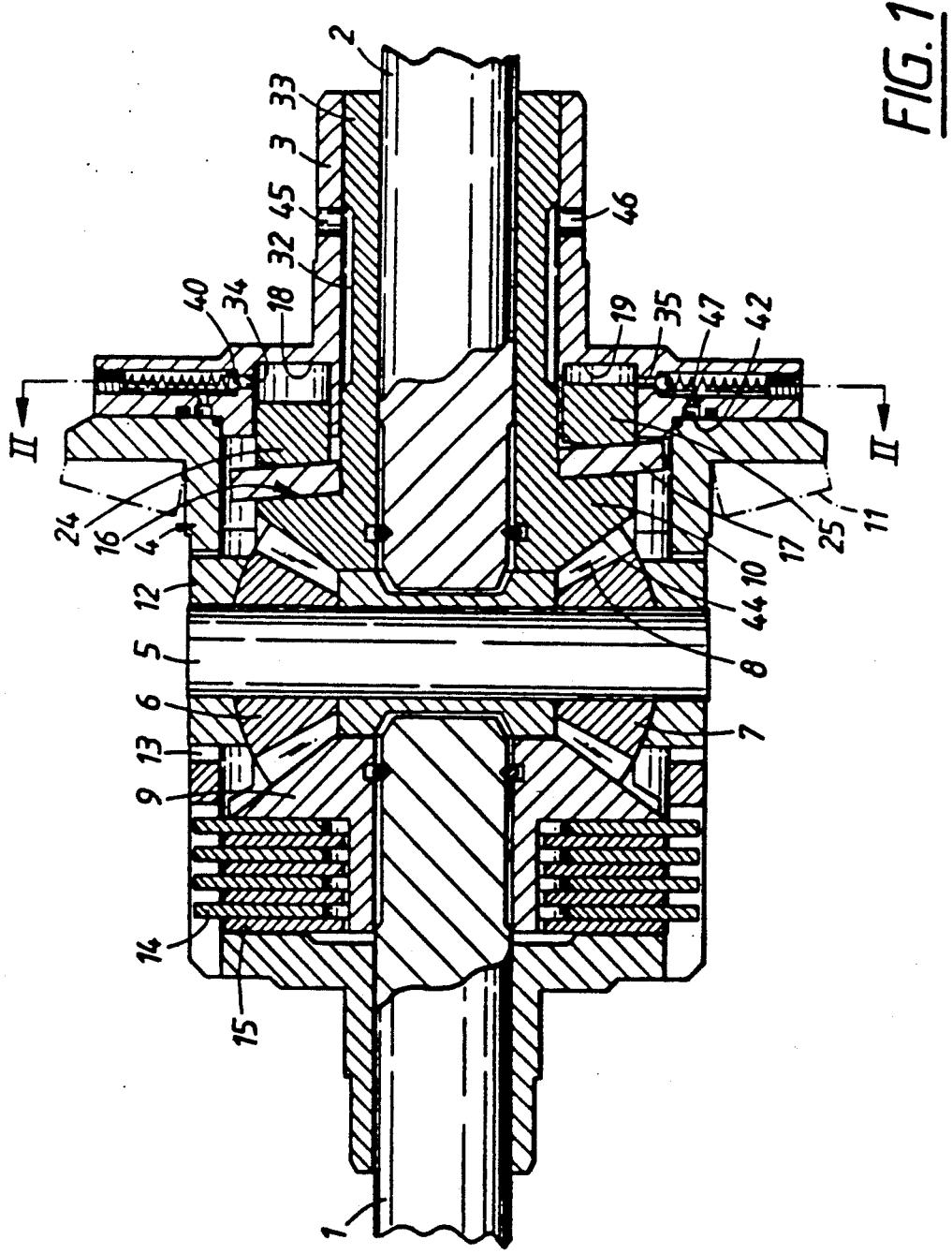
FIG. 1 is a partly broken sectional view of a differential arrangement incorporating the device of the present invention.

Referring to FIG. 1, a conventional differential is shown incorporating the device of the present invention, a so-called limited slip differential. The differential includes drive shafts 1, 2 which are disposed for rotation in differential casing 4. Enclosed within differential casing 4 are differential crown wheels 9, 10, fixedly attached for rotation with drive shafts 1, 2, respectively, and differential pinion wheels 6, 7 rotatably fitted to pinion shaft 5 in right angle engagement with crown wheels 9, 10. This arrangement is typical in a motor driven vehicle where the drive shafts 1, 2 drive the wheels of the vehicle. Although not shown in FIG. 1, the differential arrangement is rotatably fitted to a differential housing.

Again referring to FIG. 1, the dash-dotted line shows the main crown wheel 11 which is fixedly connected to the differential arrangement for rotation therewith. The incoming pinion shaft which drives the main crown wheel 11 and the differential arrangement is not shown. A central part 12 is disposed inside the differential casing 4 so as to be slightly moveable sideways in the opening 13 where the differential pinion wheels 6, 7 are located on the pinion shaft 5. Both differential crown wheels 9, 10 are also slightly moveable sideways relative to the differential casing 4. Floating drive shafts 1, 2 in splines inside the differential crown wheels 9, 10 permits this movement. In addition, solidly fixed to one side of the differential casing 4 are a number of braking elements 14, each of which has a matching braking element 15 fixedly connected to the rotatable differential crown wheel 9 which rotates with outgoing drive shaft 1.

In accordance with the present invention, the differential crown wheel 10 has an angled surface 16 opposite its conical teeth 44. Surface 16 is slightly displaced from a 90 degree angle with respect to drive shaft 2. A round even disc 17 is disposed inside the differential casing 4 so that it can move freely against surface 16.

Figure 2:
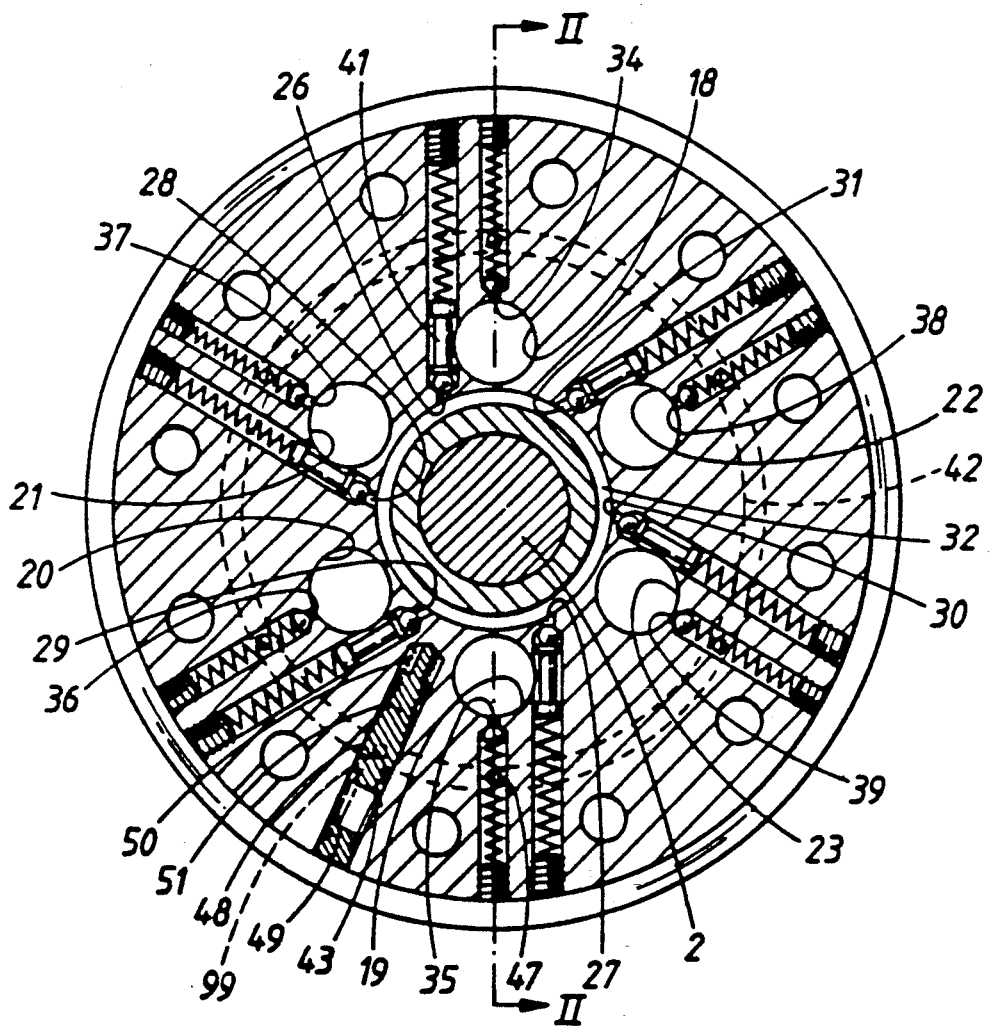
FIG. 2 is a sectional view through line II—II of FIG. 1.

Arranged inside of differential casing 4 are several evenly pitched piston chambers 18, 19, 20, 21, 22, 23, shown more clearly in FIG. 2, which contain moveable pistons 24, 25. The inside of each piston chamber is designed to contain pressurized fluid to force the pistons 24, 25 against the disc 17. To supply fluid thereto, the piston chambers 18–23 are each provided with an inlet 26, 27, 28, 29, 30, 31, respectively. A non-return valve 41 fitted in each of inlet openings 26–31 allows fluid to enter the piston chambers but prevents the fluid from escaping therefrom. As shown in FIG. 1, the pressure chamber inlets 26-31 communicate with openings 45, 46 through a groove 32 formed in the tubular portion of the differential crown wheel 10. Also connected to each of the piston chambers 18-23 is an outlet 34, 35, 36, 37, 38, 39, respectively, which also contains a non-return valve to prevent any pressurized fluid which has been released from re-entering the piston pressure chambers 18-23. Furthermore, as shown in FIG. 2, a circular bore 42 connects all of the outlets 34-39 through an aperture 47 in each outlet. Circular bore 42 leads to an unpressurized oil pan or sump through an adjustable valve 43. In one embodiment, the adjustable regulating valve 43 consists of a piston 48 having a cylindrical portion disposed for sliding engagement with a close fit in bore 49, and having a conical portion 51. A spring 50 disposed at one end of piston 48 biases the piston in an outward direction. An aperture 99 in the bore 49 controls the flow of pressurized fluid from the piston chambers 18-23. By changing the position of piston 48 in bore 49, the degree to which aperture 99 is open will be altered. Thus, aperture 99 may be closed by the cylindrical portion of piston 48, but as the piston 48 is adjusted outwardly so that the conical portion 51 extends over the aperture 99 flow is permitted, thereby allowing the pressurized fluid to escape from the piston chambers 18-23. The position of piston 48 in valve 43 may be regulated by pressurized fluid that is supplied to bore 49 through a radial bore, not shown. This radial bore could communicate with the groove 32 and thereby employ the pressurized inlet fluid for regulation.

Since the above-described arrangement causes the adjustment of valve 43 to be controlled externally of the internal pressure of the fluid system, pressure variations on the inlet side of pressure chambers 18-23 do not affect the operation of regulating valve 43. The inlet openings 26-31 are connected to a pressure source through the openings 45-46 to achieve constant pressure in the piston chambers 18-23. Inasmuch a the sleeve 3 rotates together with the differential casing 4 when in motion, the pressure fluid will be transferred in a known fashion through a circular non-rotating casing, not shown, that forms a seal over the sleeve 3 and thus surrounds the openings 45, 46. Even with a rather low fluid pressure, enough force can be created to move the pistons 24, 25 against the angled surface 16.

In stable running conditions, such as driving straight ahead on an even road surface with even friction, both of shafts 1, 2 rotate with the same rotational velocity as the differential crown wheel 10, whereby no relative rotational movement takes place between the differential crown wheel 10 and the pistons 24, 25. At this stage the braking elements 14, 15 run free of each other and do not show any difference in relative rotational velocity. Should a difference in rotational velocity appear between the shafts 1, 2, the differential casing 4 will rotate together with the set of pistons 24, 25 around the shaft 2 relative to the angled surface 16, thereby exerting an inward force on pistons 24, 25. If there is a sufficient decrease in fluid pressure, depending on the position of piston 48 in regulating valve 43, the movement of pistons 24, 25 into the piston chambers will be opposed by an increase in the fluid pressure in the pressure chambers.

Since the non-return valves 41 in inlet openings 26-31 prevent the pressure fluid from escaping from piston chambers 18-23, the pressure fluid can only escape therefrom through outlets 34-39. Moreover, pressure fluid cannot escape from one piston chamber into another which may have been expanding as a result of regulating valve 43 being closed. As the angled surface 16 rotates relative to the pistons 24, 25, the pistons continue to be pushed inwardly. If the fluid pressure in the piston chambers is high enough to resist the inward movement of pistons 24, 25, the differential crown wheel 10 will begin to move sideways against the shaft 5. As a result, the differential pinion wheels 6, 7, together with the differential crown wheel 9 and its associated braking elements 15, will also be moved sideways against braking elements 14. This will create a braking of the relative movement of the differential crown wheel 9 with respect to the movement of the differential casing 4. The differential pinion wheels 6, 7 will therefore stop and lock both outgoing shafts 1, 2 to the same rotational velocity.

Figure 3:
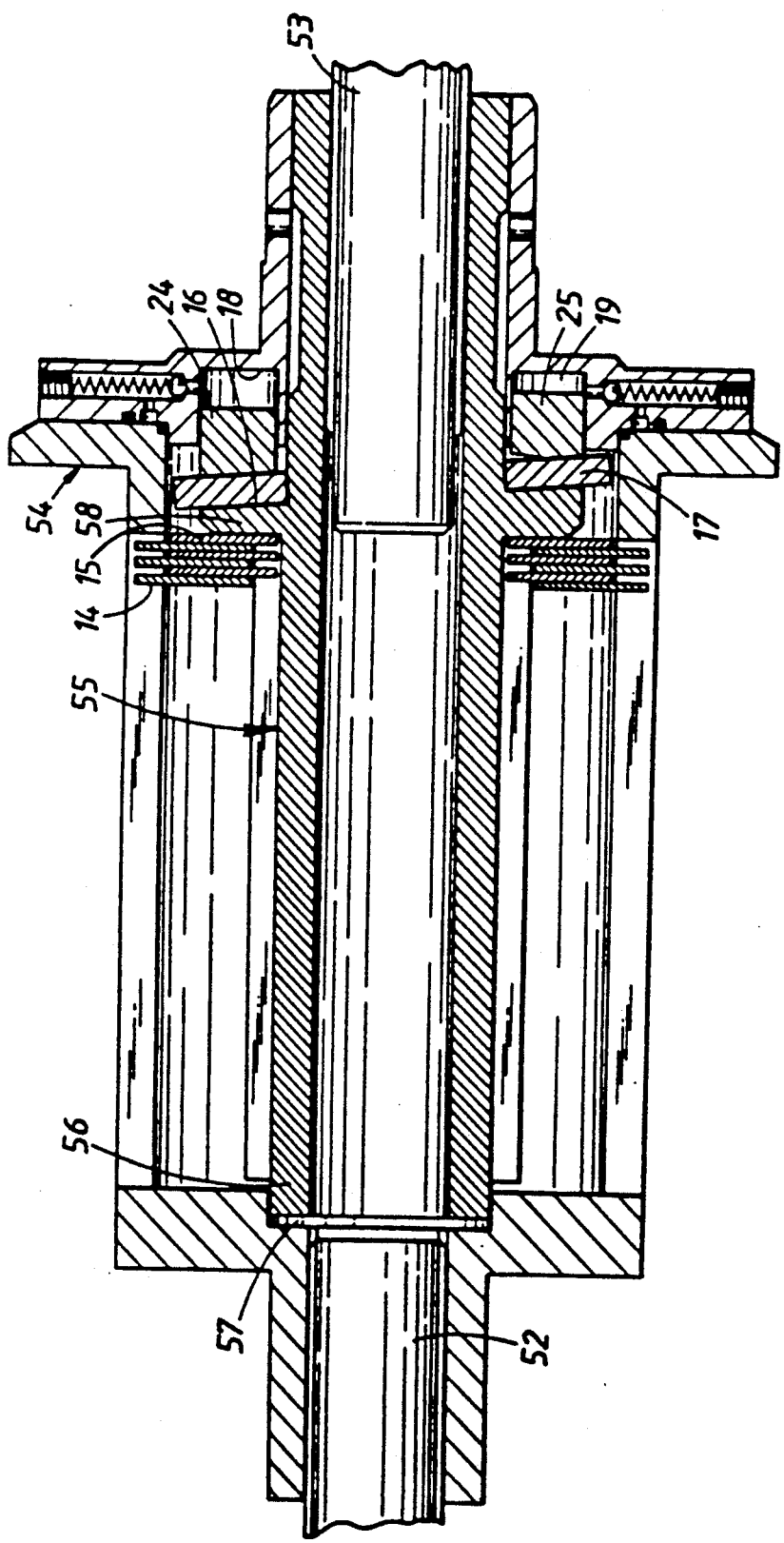
FIG. 3 is a sectional view through a second embodiment of the device in accordance with the present invention.

In accordance with a second embodiment shown in FIG. 3, the device of the present invention is applied to two shafts 52, 53 which may rotate relative to one another without any differential gears. For instance, this arrangement may be employed in an adjustable transmission disposed between the front drive axle and the rear drive axle in a four-wheel driven vehicle. In the case of bad traction on one of the axles, the device would brake the increase in rotational velocity and transfer the power to the non-slipping axle. The device could be of the same design as in the present example. Therefore, the view shown in FIG. 2 is equally applicable to the device shown in FIG. 3. The pistons 24, 25 and the piston chambers 18-23 are located in a casing which is fixedly connected to the drive shaft 52 coupled, for instance, to the front axle of the vehicle. The other drive shaft 53 is rotatably disposed through tubular sleeve 55 which is arranged for sideways movement in casing 54. A space 57 at the inside end of sleeve 55 permits the sleeve to move sideways, but still provides an area of support 56 to the drive shaft 53. A set of braking elements 14 is fixedly connected for rotation with casing 54 and the shaft 52. Another set of braking elements 15 is fixedly connected to tubular sleeve 55 for rotation with shaft 53. The number of braking elements may vary to correspond to the forces being transmitted.

As described above in connection with the previous embodiment, the tubular sleeve 55 contains an angled surface 16 and a round even disc 17. In a stable running condition, both drive shafts 52, 53 rotate with the same rotational velocity, whereby both sets of braking elements 14, 15 run free of one another. Upon a change in the relative rotational velocity, the angled surface 16 is turned relative to the set of pistons 24, 25, thereby forcing the pistons into piston chambers 18-23. Depending on the chosen setting of the regulating valve 43, which is of the same construction as shown in FIG. 2, the system pressure will prevent the pistons 24, 25 from being pushed inwardly. As a result, the rotation of angled surface 16 relative to pistons 24, 25 will instead force the sleeve 55 sideways along with its braking elements 15, into engagement with the braking elements 14 attached to casing 54, whereby the fastest rotating shaft will be slowed down until it reaches the same rotational velocity as the other shaft.

Figure 4:
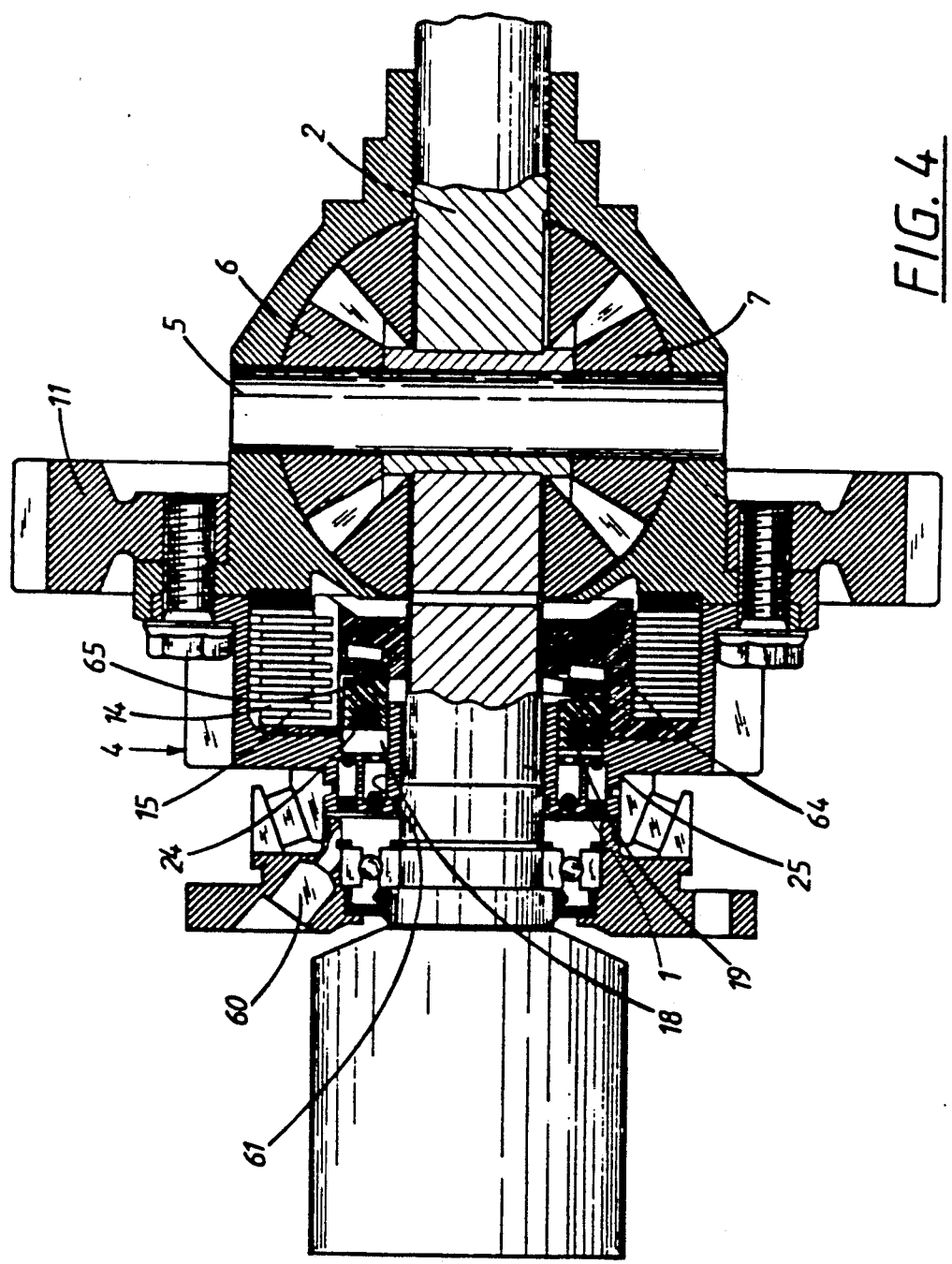
FIG. 4 is a sectional view through a third embodiment of the device in accordance with the present invention.

A third embodiment, in which the present invention is applied in a gear box differential, is shown in FIG. 4. The main features of this embodiment are similar to the first embodiment, in which a conventional differential is used in conjunction with the device of the present invention. In similar fashion to the first embodiment, the third embodiment has a set of movable pistons 24, 25 which are disposed inside of piston chambers 18, 19 arranged around shafts 1, 2. In principle, the fluid system of the third embodiment may be the same as that described above in connection with the first embodiment. Thus, fluid may be supplied from a pressure source through an inlet 60 and valve 61 to piston chambers 18, 19, each of which may be fitted with an additional non-return valve to permit fluid to flow only inwardly from the pressure source. Similarly, each piston chamber has an outlet to the circular bore 42, each outlet having a valve which permits fluid to flow outwardly from the piston chambers, but which prevents the inward flow of fluid thereto.

The difference between the first and third embodiments is that the rotatable unit 64 having angled surface 65 is formed as a separate part, not attached to any of the differential crown wheels. A spline connection between unit 64 and shaft 1 enables these elements to rotate together while permitting relative sideways movement between the two. A first set of braking elements 15 are connected to rotating unit 64, while another set of braking elements 14 is fixedly connected to differential casing 4. In accordance with this design, the whole device of the present invention is fitted to one side of the differential casing. Hence, the unit containing the pistons, the piston chambers and the rotating unit with its angled surface and braking elements are all fitted to the same side of the differential, whereby no sideways movement of the central unit is required. As a result, the sideways movement is only performed by the rotatable unit containing the braking elements.

The principle function of the device of the present invention is similar in both cases. That is to say that a certain variation in rotational velocity between the rotatable unit and the differential casing is permitted up to a certain speed before the pistons are forced into the piston chambers. When this speed is reached, a sideways movement of rotatable unit 64 takes place, thereby leading to the engagement of the braking elements and, hence, a reduction of the difference in rotational velocity between the two shafts 1, 2.

The invention described and shown in the drawings, however, is not only limited to these embodiments. Thus, instead of moving the transmission pinion wheels and their shafts sideways, as shown in FIG. 1, there could be a different arrangement wherein the angled surface could be part of a sleeve surrounding the differential casing and connected to one portion of the braking elements, and the whole assembly may be rotatable and movable sideways. The device of the present invention could also be used in other applications where variations in rotational velocity is to be opposed. To regulate the valves, a separate fluid could be used together with a separate pressure source, but by using the same fluid for the whole system, a good solution is presented to the transfer of fluid to the moving unit and the removal of excess fluid. The braking elements could be either discs or shoes, and the total number of each could vary depending on the forces to be transferred. The regulating valve could be preset and fixed at a suitable pressure, but this would prevent the resistance in the pistons from being regulated and cut down on the flexibility of the device.

I claim:

1. A device for opposing relative rotational movement comprising
   a rotatable housing defining a cavity,
   a plurality of chambers disposed axially in said housing with respect to the axis of rotation of said housing and opening into said cavity,
   a plurality of pistons reciprocally mounted in said chambers and projecting into said cavity,
   inlet means associated with each of said chambers for supplying a fluid from a fluid source to said chambers, whereby a fluid pressure is established in each of said chambers,
   outlet means associated with each of said chambers for releasing said fluid from said chambers,
   first and second shafts rotatably disposed in said housing along the axis of rotation of said housing,
   first braking means operatively connecting for rotation with said first shaft,
   second braking means operatively connected for rotation with said second shaft,
   rotation element means operatively connected to said first shaft for rotation therewith and having a surface inclined from a perpendicular direction with respect to the axis of rotation of said housing and arranged for engagement with said plurality of pistons, said rotation element means disposed for axial displacement with respect to the axis of rotation of said housing, whereby a rotational displacement of said inclined surface relative to said plurality of pistons causes an increase in said fluid pressure in at least one of said chambers with a resultant axial displacement of said rotation element means, thereby resulting in braking engagement between said first and second braking means, and
   flow control means disposed in fluid communication with said outlet means for controlling the flow rate of said fluid through said outlet means and thus said axial displacement of said rotation element means and said braking engagement between said first and second braking means.

2. The device as claimed in claim 1 wherein said first braking means is fixedly connected to said housing for rotation therewith.

3. The device as claimed in claim 1 wherein said first braking means is fixedly connected to said rotation element means for rotation therewith.

4. The device as claimed in claim 1 wherein said flow control means comprises an adjustable valve for selectively controlling the flow rate of said fluid through said outlet means.

5. The device as claimed in claim 1 further comprising inlet valve means associated with each of said inlet means for permitting said fluid to flow into said chambers and for preventing said fluid from flowing out from said chambers through said inlet means.

6. The device as claimed in claim 1 further comprising outlet valve means associated with each of said outlet means for permitting said fluid to flow out from said chambers and for preventing said fluid from flowing into said chambers through said outlet valve means.

7. A device for opposing relative rotational movement comprising,
   a rotatable housing defining a cavity,
   a plurality of chambers disposed axially in said housing with respect to the axis of rotation of said housing and opening into said cavity,
   a plurality of pistons reciprocally mounted in said chambers and projecting into said cavity,
   inlet means associated with each of said chambers for supplying a fluid from a fluid source to said chambers, whereby a fluid pressure is established in each of said chambers, outlet means associated with each of said chambers for releasing said fluid from said chambers, first and second shafts rotatably disposed in said housing along the axis of rotation of said housing, first braking means operatively connected for rotation with said first shaft, second braking means operatively connected for rotation with said second shaft, rotation element means operatively connected to said first shaft for rotation therewith and having a surface inclined from a perpendicular direction with respect to the axis of rotation of said housing and arranged for engagement with said plurality of said pistons, said rotation element means disposed for axial displacement with respect to the axis of rotation of said housing, whereby a rotational displacement of said inclined surface relative to said plurality of pistons causes an increase in said fluid pressure in at least one of said chambers with a resultant axial displacement of said rotation element means, thereby resulting in braking engagement between said first and second braking means, and adjustable flow control means for selectively controlling the flow rate of said fluid through said outlet means and thus said axial displacement of said rotation element means and said braking engagement between said first and second braking means, the adjustment of said flow control means being determined independently of said increased fluid pressure.

8. The device as claimed in claim 7 wherein said first braking means is fixedly connected to said housing for rotation therewith.

9. The device as claimed in claim 7 wherein said first braking means is fixedly connected to said rotation element means for rotation therewith.

10. The device as claimed in claim 7 further comprising inlet valve means associated with each of said inlet means for permitting said fluid to flow into said chambers and for preventing said fluid from flowing out from said chambers through said inlet means.

11. The device as claimed in claim 7 further comprising outlet valve means associated with each of said outlet means for permitting said fluid to flow out from said chambers and for preventing said fluid from flowing into said chambers through said outlet means.

* * * * *

UNITED STATES PATENT AND TRADEMARK OFFICE
CERTIFICATE OF CORRECTION

PATENT NO. : 5,087,228

DATED : February 11, 1992

INVENTOR(S) : Johansson

It is certified that error appears in the above-identified patent and that said Letters Patent is hereby corrected as shown below:

Column 3, line 39, "a" should read --as--.

Column 6, line 14, "connecting" should read --connected--.

Signed and Sealed this

Twenty-seventh Day of April, 1993

Attest:

MICHAEL K. KIRK

*Attesting Officer*  *Acting Commissioner of Patents and Trademarks*